United States Patent [19]

Frisque

[11] Patent Number: 5,080,590
[45] Date of Patent: Jan. 14, 1992

[54] LEARNING AID BOOK

[76] Inventor: Andrew P. Frisque, 23465 Vallarta, Laguna Niguel, Calif. 92677

[21] Appl. No.: 242,893

[22] Filed: Sep. 12, 1988

[51] Int. Cl.$^5$ ............................................. G09B 11/04
[52] U.S. Cl. ...................................... 434/88; 434/410
[58] Field of Search ................. 434/88, 410, 414, 419, 434/423

[56] References Cited

U.S. PATENT DOCUMENTS

| | | | |
|---|---|---|---|
| 2,596,890 | 8/1948 | Dechert | 434/410 |
| 3,149,425 | 9/1964 | Barish | 434/410 |
| 3,279,100 | 10/1966 | Knott | 434/410 |

FOREIGN PATENT DOCUMENTS 821703  6/1937  France ................................ 434/410

*Primary Examiner*—Edward M. Coven
*Attorney, Agent, or Firm*—W. Edward Johansen

[57] ABSTRACT

A learning aid book has a plurality of pages and includes a book binder which binds the plurality of pages. Each page has a bottom portion and a top portion. The bottom portion includes an opaque foil, a rigid base and a first frame. The opaque foil is formed from a polymeric compound and has a top surface. The rigid base is detachably coupled to the book binder. The first frame mechanically couples the opaque foil to the rigid base. The top portion includes a transparent foil and a second frame. The transparent foil has a top surface and a bottom surface. The second frame tautly frames the transparent foil and is detachably coupled to the book binder. The opaque foil has a plurality of images each of which is derived from a group of figures and characters printed on its top surface. The bottom surface of the transparent foil is disposed adjacent to the top surface of the opaque foil. Each of the respective areas of the opaque and transparent foils are releasably pressure-adhered to each other. A person can trace each image by applying pressure to the top surface of the transparent foil and can release the traced image by lifting the second frame away from the first frame.

4 Claims, 1 Drawing Sheet

LEARNING AID BOOK

BACKGROUND OF THE INVENTION

1. Field of the Invention

This invention relates to a learning aid book for aiding learning by a person and more particularly to a learning aid book in which a person uses pressure by a blunt instrument to trace a plurality of images on a surface and is able to simply and repeatedly release the traced images.

2. Description of the Prior Art

U.S. Pat. No. 4,702,700, entitled Activity Book with Removable Manipulatives, issued to Cheryl J. Taylor on Oct. 27, 1987, teaches an activity book with multi-educational features for self-learning and directed learning by children which includes a set of bound pages, a plurality of which are characterized by having a visual object thereon with at least one magnet mounted within the outline of the visual object, having a pocket as an integral part of the page, removable manipulatives capable of being stored within the pocket and having magnet for removably attaching to other magnet and an additional magnet which is positioned on the pocket of sufficient size that at least two of the manpulatives can be placed thereon and securely held.

U.S. Pat. No. 4,245,401, entitled Planning Device, issued to Harald Riehle on Jan. 20, 1981, teaches a planning device which includes a base foil and a transparent foil which are hingeably connected to each other along one edge. Both the surface of the transparent foil and the surface of the base foil adjacent to the transparent foil are smooth for repeated, releasable pressure-adherence to each other. Any object having a smooth surface can be repeatedly and releasably pressure-adhered to the smooth surface of the transparent foil.

U.S. Pat. No. 4,427,390, entitled Educational Book-Like Toy, issued to Nina Manger on Jan. 24, 1984, teaches an instructional toy which instructs young children by association and which has colored three-dimensional overlays which correspond to printed matter on rigid pages. Each rigid page is of a slightly different shade of the color of the overlay for visual distinction them when the overlay is properly positioned. Each overlay engages with only one corresponding printed matter on one page. Multiple pages are printed of various colors such that the page between page of primary color indicates the color resulting from a mixture of those primary colors.

U.S. Pat. No. 3,885,326, entitled Educational Method and Apparatus, issued to Paul F. Burton and Madeleine O. Robinson on May 27, 1975, teaches a system for vocabulary self-instruction including the concepts of both a working vocabulary and a recognition vocabulary. The system includes a word-bearing card color which is coded according to the part of speech of the word. The card also bears information with respect to the word on the card. A holder for the card bears space for written student responses. The holder is formed with aperture to expose the word on the card and mask the information. The holder is a transversely folded panel which is apertured at diagonally opposite corners and which is formed with a cleanable writing surface. The system lends itself to a great variety of materials such as cards, books, slides and transparencies. All of the words to be learned are categorized by part of speech which are indicated by various colors. There are testing devices such as shields to cover parts of the above sequence.

SUMMARY OF THE INVENTION

In view of the foregoing factors and conditions which are characteristic of the prior art it is the primary object of the present invention to provide a learning aid book in which a person uses pressure by a blunt instrument to trace a plurality of images on a surface and is able to simply and repeatedly release the traced images.

In accordance with the present invention an embodiment of a learning aid book has been described. The learning aid book has a plurality of pages and includes a book binder which binds the plurality of pages. Each page has a bottom portion and a top portion. The bottom portion includes an opaque foil, a rigid base and a first frame. The opaque foil is formed from a polymeric compound and has a top surface. The rigid base is detachably coupled to the book binder. The first frame mechanically couples the opaque foil to the rigid base. The top portion includes a transparent foil and a second frame. The transparent foil has a top surface and a bottom surface. The second frame tautly frames the transparent foil and is detachably coupled to the book binder. The opaque foil has a plurality of images each of which is derived from a group of figures and characters printed on its top surface. The bottom surface of the transparent foil is disposed adjacent to the top surface of the opaque foil. Each of the respective areas of the opaque and transparent foils are releasably pressure-adhered to each other. A person can trace each image by applying pressure to the top surface of the transparent foil and can release the traced image by lifting the second frame away from the first frame.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
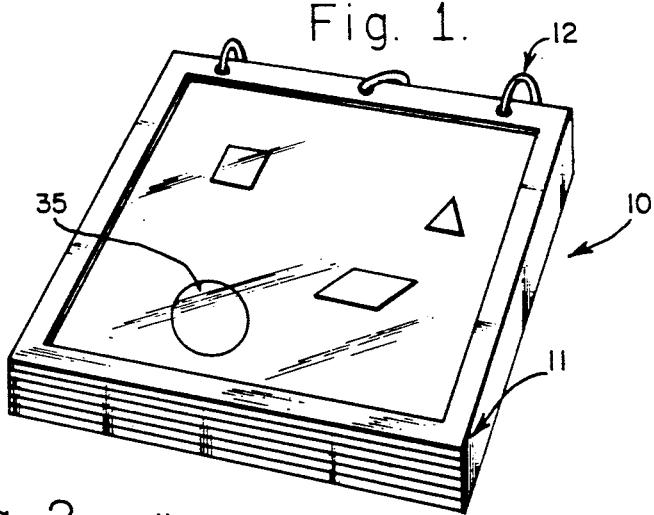
FIG. 1 is a perspective view of a learning aid book which has a plurality of pages each of which has a first bottom portion and a top portion and has been constructed in accordance with the principles of the present invention.

In order to best understand the present invention it is necessary to refer to the following description of its preferred embodiment in conjunction with the accompanying drawing. Referring to FIG. 1 in conjunction with FIG. 2 a learning aid book 10 has a plurality of pages 11 and includes a book binder 12 which binds the plurality of pages 11. Each page 11 has a bottom portion 13 and a top portion 14.

Figure 2:
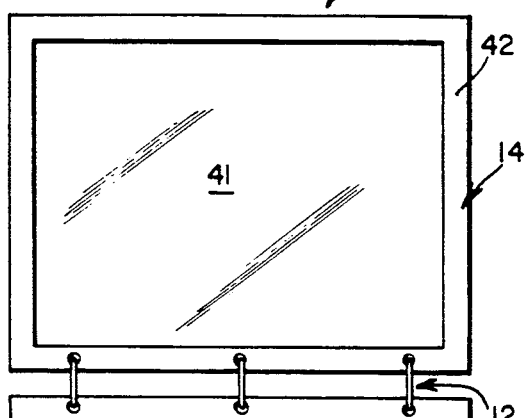
FIG. 2 is a top plan view of a second bottom portion of a page of a learning aid book which has been constructed in accordance with the principles of the present invention and a bottom plan view of the top portion thereof.
Figure 3:
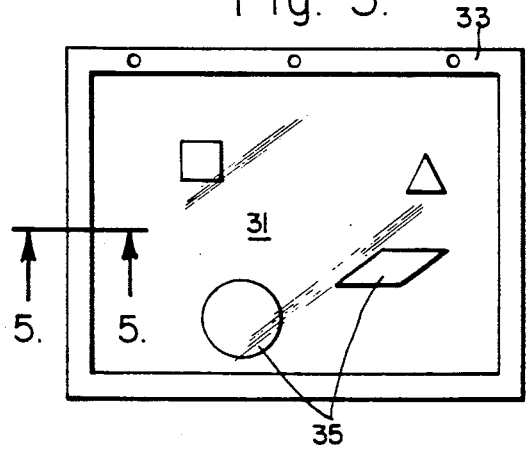
FIG. 3 is a top plan view of the first bottom portion of a page of the learning aid book of FIG. 1.

Referring to FIG. 3 in conjunction with FIG. 2 the bottom portion 13 includes an opaque foil 31, a rigid base 32 and a first frame 33. The opaque foil 31 is formed from a polymeric compound and has a top surface. The rigid base 32 is detachably coupled to the book binder 12. The first frame 33 mechanically couples the opaque foil to the rigid base 32. The opaque foil 31 has a plurality of images 35 each of which is derived from a group of figures and characters printed on its top surface. The top portion 14 includes a transparent foil 41 and a second frame 42. The transparent foil 41 has a top surface and a bottom surface. The second frame 42 tautly frames the transparent foil 41 and is detachably coupled to the book binder 12.

Figure 4:
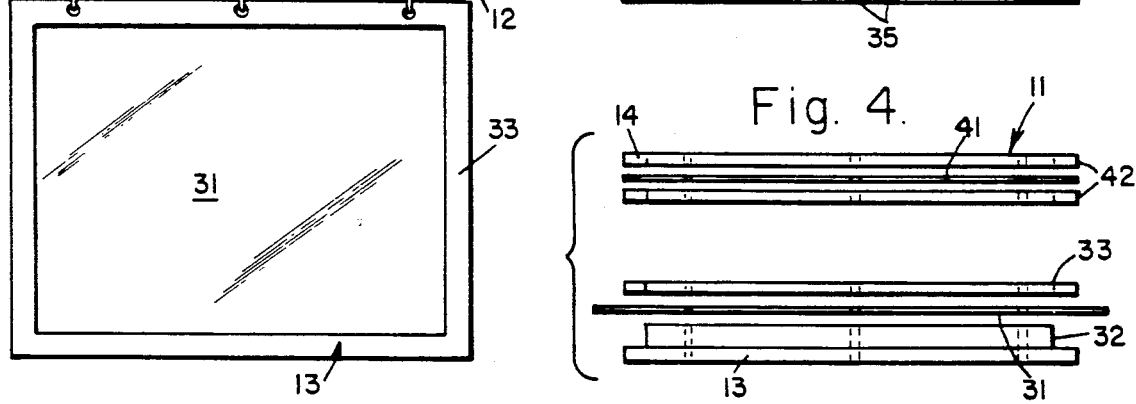
FIG. 4 is a side elevational view of the first bottom portion and the top portion of a page of the learning aid book of FIG. 1.
Figure 5:
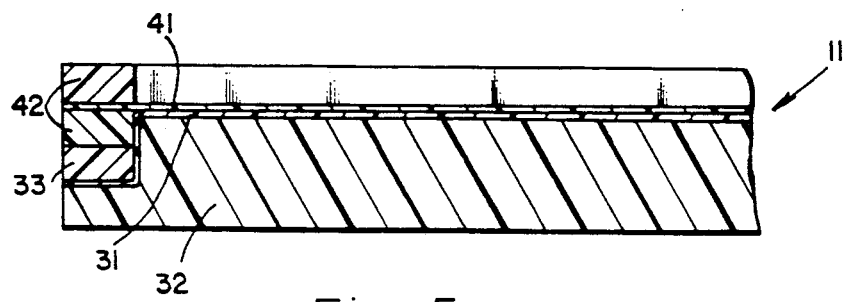
FIG. 5 is a side elevational view in cross-section of the first bottom portion and the top portion of a page of the learning aid book of FIG. 1 taken along line 5—5 of FIG. 3.

Referring to FIG. 4 in conjunction with FIG. 3 and FIG. 5 the bottom surface of the transparent foil 41 is disposed adjacent to the top surface of the opaque foil 31. Each of the respective areas of the opaque and transparent foils 31 and 41 ar releasably pressure-adhered to each other. A person can trace each image 35 by applying pressure to the top surface of the transparent foil 41 and can release the traced image 35 by lifting the second frame 42 away from the first frame 33. The transparent foil 41 may be doped with a dye from a group of various dyes in order to provide a variety of different colors thereof. When pressure is applied to an area on the top surface of the transparent foil 41 the intensity of the color changes.

From the foregoing it can be seen that a learning aid book has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A learning aid book which has a plurality of pages, said learning book comprising:
 a. book binding means for binding said pages, each of said pages having a bottom portion and a top portion, wherein said bottom portion includes:
  a. an opaque foil which has a top surface;
  b. a rigid base which is detachably coupled to said book binding means; and
  c. first framing means for mechanically coupling said opaque foil to said rigid base; and wherein said top portion includes:
  a. a transparent foil which has a top surface and a bottom surface; and
  b. second framing means for tautly framing said transparent foil, said second framing means being detachably coupled to said book binding means so that said bottom surface of the transparent foil is disposed adjacent to said top surface of said opaque foil, whereby each of said respective areas of said opaque and transparent foils are releasably pressure-adhered to each other.

2. A learning book according to claim 1 wherein said opaque foil is formed from a polymeric compound and has images derived from a group of figures and characters printed on its said top surface whereby a person can trace each of said images by applying pressure to said top surface of said transparent foil and can release said traced images by lifting said second framing means away from said first framing means.

3. A learning book according to claim 1 wherein said transparent foil is formed from a polymeric compound which has been doped with a dye in order to provide a variety of different colors thereof whereby when pressure is applied to an area on said top surface of said transparent foil the intensity of the color changes.

4. A page for use in a learning aid book which has a plurality of pages and a book binder which binds the pages, said page comprising:
 a. a bottom portion which includes:
  a. an opaque foil which has a top surface;
  b. a rigid base which is adapted to be detachably coupled to the book binder; and
  c. first framing means for mechanically coupling said opaque foil to said rigid base; and
 b. top portion which includes:
  a. a transparent foil which has a top surface and a bottom surface; and
  b. second framing means for tautly framing said transparent foil, said second framing means being adapted to be detachably coupled to the book binder so that said bottom surface of the transparent foil is disposed adjacent to said top surface of said opaque foil, whereby each of said respective areas of said opaque and transparent foils are releasably pressure-adhered to each other.

* * * * *